(12) United States Patent
Nakamura et al.

(10) Patent No.: US 11,858,534 B2
(45) Date of Patent: Jan. 2, 2024

(54) AUTOMATED DRIVING SYSTEM

(71) Applicant: Toyota Jidosha Kabushiki Kaisha, Toyota (JP)

(72) Inventors: Hiroshi Nakamura, Tokyo (JP); Akihide Tachibana, Tokyo (JP); Katsuhiro Sakai, Kawasaki (JP); Kentaro Ichikawa, Shizuoka-ken (JP); Taisuke Sugaiwa, Chofu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 142 days.

(21) Appl. No.: 17/177,602

(22) Filed: Feb. 17, 2021

(65) Prior Publication Data

US 2021/0300434 A1  Sep. 30, 2021

(30) Foreign Application Priority Data

Mar. 30, 2020  (JP) .................. 2020-060836

(51) Int. Cl.
*B60W 60/00* (2020.01)
*B60W 30/18* (2012.01)

(52) U.S. Cl.
CPC .... *B60W 60/00253* (2020.02); *B60W 30/181* (2013.01); *B60W 2420/42* (2013.01); *B60W 2420/52* (2013.01); *B60W 2552/00* (2020.02); *B60W 2554/802* (2020.02)

(58) Field of Classification Search
CPC ......... B60W 60/00253; B60W 30/181; B60W 2420/42; B60W 2420/52; B60W 2552/00; B60W 2554/802; B60W 2556/40; B60W 2556/50
See application file for complete search history.

(56) References Cited

U.S. PATENT DOCUMENTS

| 2012/0056758 | A1* | 3/2012 | Kuhlman | G08G 1/14 340/932.2 |
|---|---|---|---|---|
| 2017/0144654 | A1* | 5/2017 | Sham | B60W 30/06 |
| 2017/0329346 | A1* | 11/2017 | Latotzki | G08G 1/164 |
| 2018/0056990 | A1* | 3/2018 | Elie | G01B 11/22 |
| 2018/0136656 | A1* | 5/2018 | Rasmusson, Jr. | G01C 21/365 |
| 2019/0295413 | A1 | 9/2019 | Hase et al. | |
| 2020/0361450 | A1* | 11/2020 | Noguchi | G08G 1/065 |

FOREIGN PATENT DOCUMENTS

JP  2019-168370 A  10/2019

\* cited by examiner

*Primary Examiner* — James J Lee
*Assistant Examiner* — Alexander George Matta
(74) *Attorney, Agent, or Firm* — Dinsmore & Shohl LLP

(57) ABSTRACT

A pick-up and drop-off area, which is a predetermined area in which an automated driving vehicle stops to pick up or drop off a user, includes a downstream area existing downstream of a standard stop space and an upstream area existing upstream of the standard stop space. An automated driving system controls the automated driving vehicle so as to stop in a target stop space in the pick-up and drop-off area. When the standard stop space is available, the standard stop space is set as the target stop space. When the standard stop space is not available for the automated driving vehicle to stop to drop off the user, the automated driving system searches for an upstream available space in the upstream area and preferentially sets the upstream available space as the target stop space.

3 Claims, 11 Drawing Sheets

AUTOMATED DRIVING SYSTEM

CROSS-REFERENCE TO RELATED APPLICATIONS

This application claims priority to Japanese Patent Application No. 2020-060836 filed on Mar. 30, 2020, the entire contents of which are herein incorporated by reference.

BACKGROUND

Technical Field

The present disclosure relates to an automated driving system that controls an automated driving vehicle. In particular, the present disclosure relates to an automated driving system that controls an automated driving vehicle providing a driverless transportation service.

Background Art

Patent Literature 1 discloses a technique for controlling a stop position of an automated driving vehicle. The automated driving vehicle moves toward a destination. In the vicinity of the destination, it is determined whether or not the automated driving vehicle can stop at the destination. When the automated driving vehicle cannot stop at the destination, the stop position of the automated driving vehicle is changed to a position other than the destination.

LIST OF RELATED ART

Patent Literature 1: Japanese Laid-Open Patent Publication No. JP-2019-168370

SUMMARY

A driverless transportation service utilizing an automated driving vehicle has been proposed. The automated driving vehicle picks up a user and then autonomously travels to a destination. When arriving at the destination, the automated vehicle drops off the user.

A facility such as a hotel, a building, a station, an airport, and the like is sometimes provided with a predetermined pick-up and drop-off area (carriage porch) in which the automated driving vehicle stops to pick up or drop off the user. When making the automated driving vehicle stop in such the predetermined pick-up and drop-off area, it is desirable to appropriately determine a stop space (stop position) from a viewpoint of the user.

Patent Literature 1 does not disclose how to determine a stop space in such a predetermined pick-up and drop-off area. There is room for improvement in how to determine a stop space for an automated driving vehicle in a predetermined pick-up and drop-off area.

An object of the present disclosure is to provide a technique that can appropriately determine a stop space in a predetermined pick-up and drop-off area from a viewpoint of a user when making an automated driving vehicle stop in the predetermined pick-up and drop-off area.

An automated driving system controls an automated driving vehicle providing a driverless transportation service to a user. A pick-up and drop-off area is a predetermined area in which the automated driving vehicle stops to pick up or drop off the user. The automated driving system includes: a processor configured to control the automated driving vehicle so as to stop in a target stop space in the pick-up and drop-off area; and a memory configured to store standard stop position information indicating a position of a standard stop space in the pick-up and drop-off area and surrounding situation information indicating a situation around the automated driving vehicle. A direction of vehicle travel in the pick-up and drop-off area is a first direction that is predetermined. The pick-up and drop-off area includes a downstream area existing in the first direction from the standard stop space and an upstream area existing in a second direction opposite to the first direction from the standard stop space. The processor determines, based on the surrounding situation information, whether or not the standard stop space indicated by the standard stop position information is available for the automated driving vehicle to stop. When the standard stop space is available for the automated driving vehicle to stop, the processor sets the standard stop space as the target stop space. When the standard stop space is not available for the automated driving vehicle to stop, the processor sets the target stop space as follows.

First, a case where the standard stop space is not available for the automated driving vehicle to stop to drop off the user is considered. In the case of drop-off, the processor searches for an upstream available space in the upstream area in which the automated driving vehicle can be stopped, based on the surrounding situation information. Then, the processor preferentially sets the upstream available space as the target stop space.

Making the automated driving vehicle stop not in the downstream area but in the upstream area enables the user to more quickly get off the automated driving vehicle. As a result, the user becomes free more quickly and is able to use time efficiently. That is, convenience and time efficiency are improved from the viewpoint of the user.

Next, a case where the standard stop space is not available for the automated driving vehicle to stop to pick up the user is considered. In the case of pick-up, the processor searches for a downstream available space in the downstream area in which the automated driving vehicle can be stopped, based on the surrounding situation information. Then, the processor preferentially sets the downstream available space as the target stop space.

The automated driving vehicle stopped in the downstream area is able to exit the pick-up and drop-off area earlier than when the automated driving vehicle is stopped in the upstream area. Therefore, making the automated driving vehicle stop not in the upstream area but in the downstream area enables the automated driving vehicle with the user to more quickly depart for a destination. That is, time efficiency is improved from the viewpoint of the user.

Moreover, when viewed from the automated driving vehicle stopped in the downstream area, the standard stop space exists rearward. Therefore, another vehicle stopped in the standard stop space does not hinder the automated driving vehicle from starting. Therefore, the automated driving system is able to easily make the automated driving vehicle start moving. This is preferable from a viewpoint of vehicle travel control. In addition, the automated driving system is able to make the automated driving vehicle depart without delay. This contributes not only to improvement in the time efficiency but also to reduction in the user's stress in the automated driving vehicle.

As described above, according to the present disclosure, it is possible to determine an appropriate stop space from the viewpoint of the user when making the automated driving vehicle stop in the predetermined pick-up and drop-off area.

DETAILED DESCRIPTION

Embodiments of the present disclosure will be described with reference to the accompanying drawings.

1. First Embodiment 1-1. Driverless Transportation Service

Figure 1:
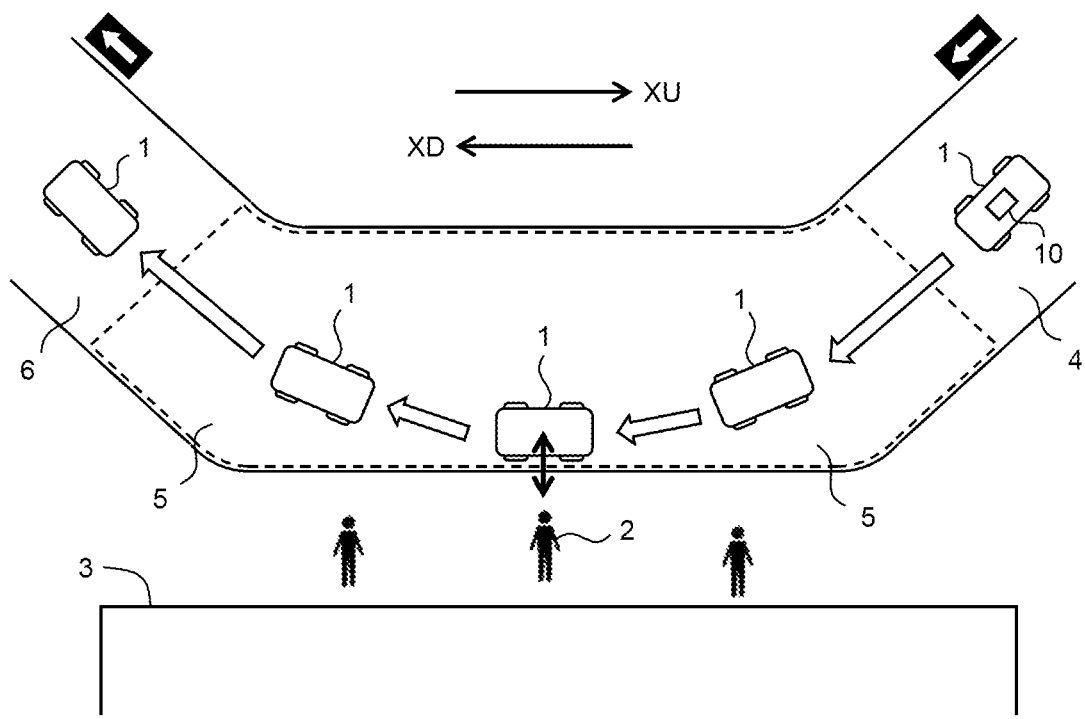
FIG. 1 is a conceptual diagram for explaining an outline of a driverless transportation service provided by an automated driving vehicle according to a first embodiment.

FIG. 1 is a conceptual diagram for explaining an outline of a driverless transportation service provided by an automated driving vehicle 1 according to a first embodiment. The automated driving vehicle 1 is capable of travelling autonomously without a driving operation by a driver. Examples of the automated driving vehicle 1 include a driverless taxi and a driverless bus. Such the automated driving vehicle 1 provides the driverless transportation service to a user 2.

More specifically, the automated driving vehicle 1 picks up a user 2 at a position specified by the user 2 or a predetermined position. Then, the automated driving vehicle 1 autonomously travels to a destination specified by the user 2 or a predetermined destination. When arriving at the destination, the automated driving vehicle 1 drops off the user 2. Picking up the user 2 by the automated driving vehicle 1 is hereinafter referred to as "pick-up." On the other hand, dropping off the user 2 by the automated driving vehicle 1 is hereinafter referred to as "drop-off." Boarding and alighting of the user 2 are sometimes collectively called "PUDO (Pick-Up/Drop-Off)."

In the present embodiment, a predetermined pick-up and drop-off area 5 provided in a facility 3 will be considered in particular. Examples of the facility 3 include a hotel, a building, a station, an airport, and the like. The pick-up and drop-off area 5 is a predetermined area (carriage porch) in which the automated driving vehicle 1 stops to pick up or drop off the user 2. When a destination of the user 2 is the facility 3, the automated driving vehicle 1 on which the user 2 rides stops in the pick-up and drop-off area 5 and drops off the user 2. On the other hand, when a departure place of the user 2 is the facility 3, the automated driving vehicle 1 stops in the pick-up and drop-off area 5, picks up the user 2, and departs for a destination.

The pick-up and drop-off area 5 is one-way. That is, a direction of travel of vehicles (all vehicles including the automated driving vehicle 1) in the pick-up and drop-off area 5 is predetermined. In terms of the direction of vehicle travel, "upstream" and "downstream" can be defined. That is, the direction of vehicle travel is a downstream direction XD (a first direction), and a direction opposite to the direction of vehicle travel is an upstream direction XU (a second direction). An approach road 4 provided upstream of the pick-up and drop-off area 5 is a road for guiding vehicles from a public road to the pick-up and drop-off area 5. On the other hand, an exit road 6 provided downstream of the pick-up and drop-off area 5 is a road for guiding vehicles from the pick-up and drop-off area 5 to a public road. The vehicles move in the downstream direction XD in an order of the approach road 4, the pick-up and drop-off area 5, and the exit road 6.

An automated driving system 10 controls the automated driving vehicle 1. Typically, the automated driving system 10 is installed on the automated driving vehicle 1. Alternatively, at least a part of the automated driving system 10 may be disposed outside the automated driving vehicle 1 and remotely control the automated driving vehicle 1.

The automated driving system 10 controls the automated driving vehicle 1 so as to enter the pick-up and drop-off area 5 from the approach road 4 and stop in the pick-up and drop-off area 5. When the automated driving vehicle 1 stops, the automated driving system 10 opens a door of the automated driving vehicle 1. The user 2 gets off the automated driving vehicle 1 or gets on the automated driving vehicle 1. Thereafter, the automated driving system 10 closes the door of the automated driving vehicle 1. Then, the automated driving system 10 makes the automated driving vehicle 1 start moving and travel from the pick-up and drop-off area 5 to the exit road 6.

1-2. Determination of Stop Space in Pick-Up and Drop-Off Area

Next, a method of determining a stop space (a stop position) when making the automated driving vehicle 1 stop in the pick-up and drop-off area 5 will be described. A stop space is a vacant (free) space available for a single automated driving vehicle 1 to stop. It should be noted here that the stop space is a virtual one and does not need to be actually defined by a marking line. Moreover, the stop space is so set as to include a margin (inter-vehicle distance) necessary for making a stop. Therefore, the stop space is larger than a size of the automated driving vehicle 1 to some extent. It is desirable to appropriately determine the stop space from a viewpoint of the user 2.

Figure 2:
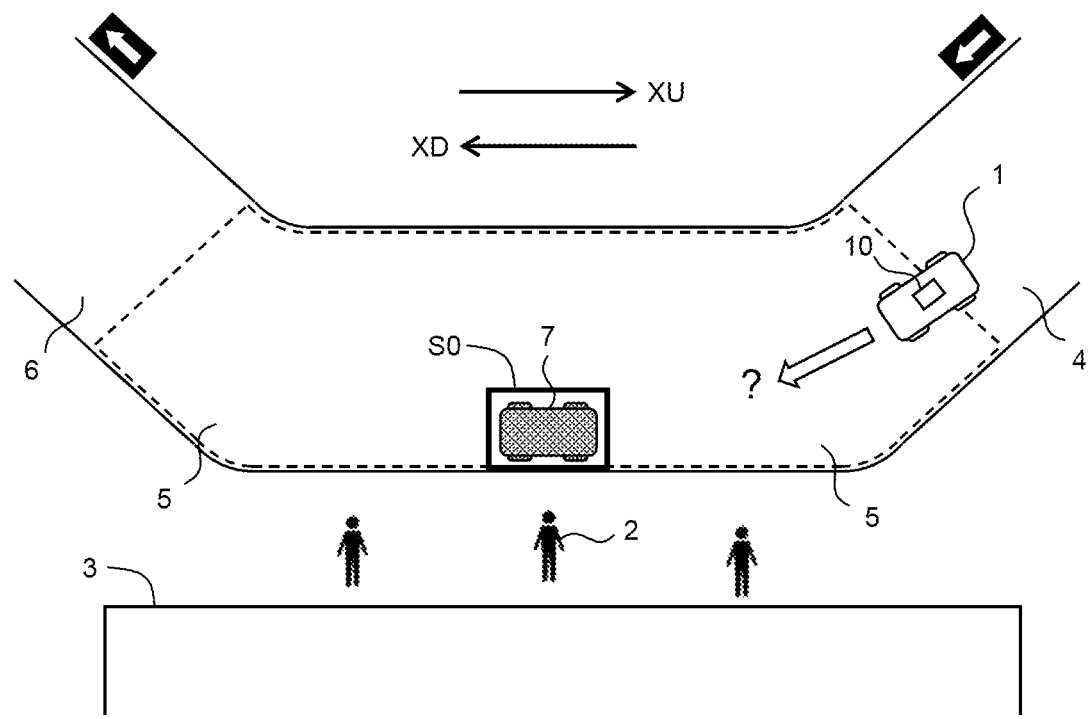
FIG. 2 is a conceptual diagram for explaining a method of determining a stop space in a pick-up and drop-off area according to the first embodiment.

FIG. 2 is a conceptual diagram for explaining a method of determining the stop space in the pick-up and drop-off area 5. In the pick-up and drop-off area 5, a "standard stop space S0" is set. The standard stop space S0 is a default stop space with high convenience or a stop space specified by the user 2. For example, the default standard stop space S0 is set to a position facing an entrance of the facility 3. Position information of the default standard stop space S0 is registered in advance in map information or provided from the facility 3 to the automated driving system 10. When the standard stop space S0 is specified by the user 2, position information of the specified standard stop space S0 is provided from a user terminal of the user 2 to the automated driving system 10.

The automated driving system 10 has a function of recognizing a situation around the automated driving vehicle 1 by the use of a sensor installed on the automated driving vehicle 1. When the standard stop space S0 is available (vacant), making the automated driving vehicle 1 stop in the standard stop space S0 is most preferable from a viewpoint of convenience for the user 2 or the request from the user 2. Therefore, when the standard stop space S0 is available for the automated driving vehicle 1 to stop, the automated driving system 10 sets the standard stop space S0 as a target stop space ST. Then, the automated driving system 10 controls the automated driving vehicle 1 so as to travel toward the target stop space ST (i.e., the standard stop space ST) and stop in the target stop space ST.

However, the standard stop space S0 is not always available. For example, as illustrated in FIG. 2, there is a case where another vehicle 7 is stopped in the standard stop space S0. In this case, it is not possible to make the automated driving vehicle 1 stop in the standard stop space S0. Therefore, the automated driving system 10 determines an alternative stop space different from the standard stop space S0.

According to the present embodiment, the automated driving system 10 determines the alternative stop space not at random but according to a predetermined rule. In particular, the automated driving system 10 determines the alternative stop space in consideration of whether a purpose of the stopping this time is the drop-off or the pick-up. Hereinafter, each case of the drop-off and the pick-up will be described.

1-2-1. Drop-Off

Figure 3:
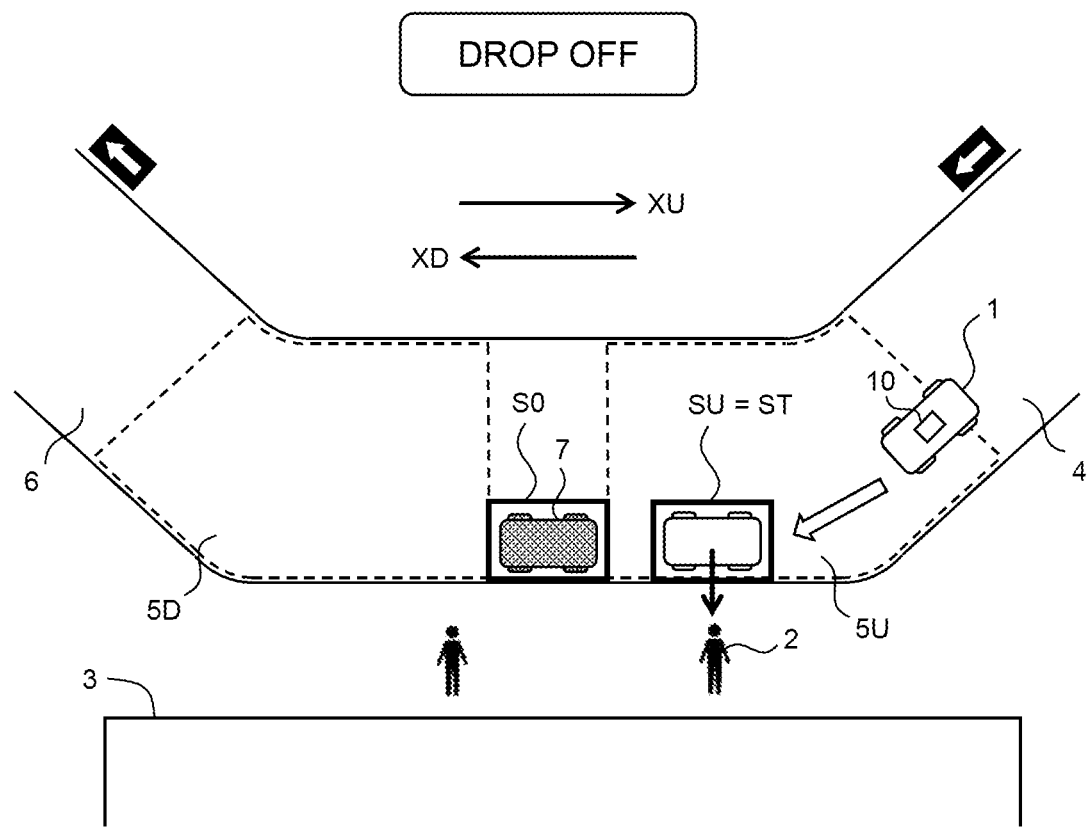
FIG. 3 is a conceptual diagram for explaining a method of determining a stop space in a case of drop-off according to the first embodiment.

FIG. 3 is a conceptual diagram for explaining a method of determining the stop space in the case of the drop-off. The pick-up and drop-off area 5 includes an upstream area 5U and a downstream area 5D. The upstream area 5U is the pick-up and drop-off area 5 existing in the upstream direction XU from the standard stop space S0. On the other hand, the downstream area 5D is the pick-up and drop-off area 5 existing in the downstream direction XD from the standard stop space S0. When the standard stop space S0 is not available at the time of the drop-off, the automated driving system 10 preferentially uses the "upstream area 5U." That is, the upstream area 5U is a priority area.

More specifically, the automated driving system 10 searches for an "upstream available space SU" that is an available (vacant) space in the upstream area 5U and in which the automated driving vehicle 1 can be stopped. In order to secure the margin, the upstream available space SU larger than the size of the automated driving vehicle 1 to some extent is necessary. When the upstream available space SU is found, the automated driving system 10 sets the upstream available space SU as the target stop space ST. For example, the automated driving system 10 sets the upstream available space SU closest to the standard stop space S0 as the target stop space ST. Being close to the standard stop space S0 is preferable from a viewpoint of convenience for the user 2 or the request from the user 2.

Then, the automated driving system 10 controls the automated driving vehicle 1 so as to travel toward the target stop space ST (i.e., the upstream available space SU) and stop in the target stop space ST. After the automated driving vehicle 1 stops, the user 2 gets off the automated driving vehicle 1.

The automated driving vehicle 1 gets to the upstream area 5U earlier than to the downstream area 5D. Therefore, making the automated driving vehicle 1 stop not in the downstream area 5D but in the upstream area 5U enables the user 2 to more quickly get off the automated driving vehicle 1. As a result, the user 2 becomes free more quickly and is able to use time efficiently. That is, convenience and time efficiency are improved from the viewpoint of the user 2.

After the user 2 gets off, the automated driving system 10 makes the automated driving vehicle 1 start moving. At this time, another vehicle 7 may still be stopped in the standard stop space S0 existing ahead of the automated driving vehicle 1. The other vehicle 7 may hinder the automated driving vehicle 1 from starting. However, since the user 2 has already got off, the user 2 does not feel stress even if the start of the automated driving vehicle 1 is somewhat delayed.

1-2-2. Pick-Up

Figure 4:
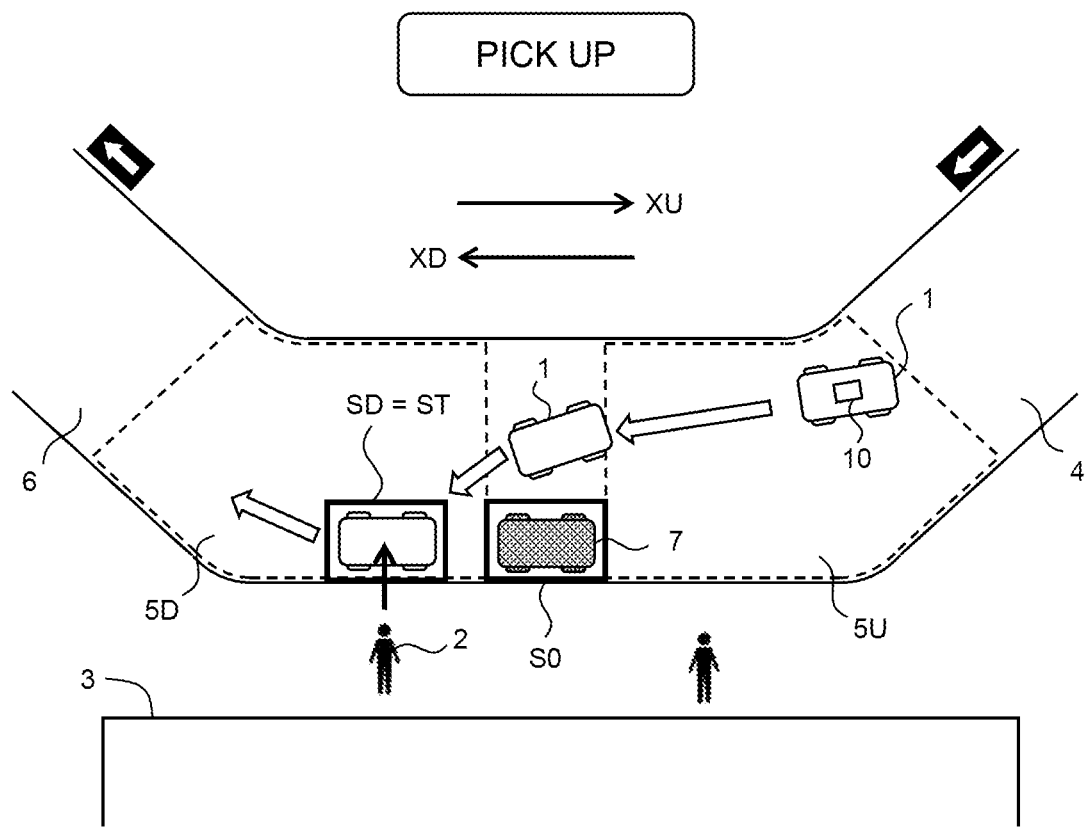
FIG. 4 is a conceptual diagram for explaining a method of determining a stop space in a case of pick-up according to the first embodiment.

FIG. 4 is a conceptual diagram for explaining a method of determining the stop space in the case of the pick-up. When the standard stop space S0 is not available at the time of the pick-up, the automated driving system 10 preferentially uses the "downstream area 5D." That is, the downstream area 5D is the priority area.

More specifically, the automated driving system 10 searches for a "downstream available space SD" that is an available (vacant) space in the downstream area 5D and in which the automated driving vehicle 1 can be stopped. In order to secure the margin, the downstream available space SD larger than the size of the automated driving vehicle 1 to some extent is necessary. When the downstream available space SD is found, the automated driving system 10 sets the downstream available space SD as the target stop space ST. For example, the automated driving system 10 sets the downstream available space SD closest to the standard stop space S0 as the target stop space ST. Being close to the standard stop space S0 is preferable from the viewpoint of the convenience for the user 2 or the request from the user 2.

Then, the automated driving system 10 controls the automated driving vehicle 1 so as to travel toward the target stop space ST (i.e., the downstream available space SD) and stop in the target stop space ST. When the automated driving vehicle 1 stops, the user 2 gets on the automated driving vehicle 1. The automated driving vehicle 1 may wait at the target stop space ST until the user 2 arrives. After the user 2 gets on the automated driving vehicle 1, the automated driving system 10 makes the automated driving vehicle 1 start moving and travel toward a next destination.

The automated driving vehicle 1 stopped in the downstream area 5D is able to exit the pick-up and drop-off area 5 earlier than when the automated driving vehicle 1 is stopped in the upstream area 5U. Therefore, making the automated driving vehicle 1 stop not in the upstream area 5U but in the downstream area 5D enables the automated driving vehicle 1 with the user 2 to more quickly depart for the destination. That is, the time efficiency is improved from the viewpoint of the user 2.

Moreover, when viewed from the automated driving vehicle 1 stopped in the downstream area 5D, the standard stop space S0 exists rearward. Therefore, another vehicle 7 stopped in the standard stop space S0 does not hinder the automated driving vehicle 1 from starting. Therefore, the automated driving system 10 is able to easily make the automated driving vehicle 1 start moving. This is preferable from a viewpoint of vehicle travel control. In addition, the automated driving system 10 is able to make the automated driving vehicle 1 depart without delay. This contributes not only to improvement in the time efficiency but also to reduction in the user 2's stress in the automated driving vehicle 1.

1-2-3. Pick-Up Following Drop-Off

After completion of the drop-off shown in FIG. 3, the automated driving vehicle 1 may pick up another user 2 in the same pick-up and drop-off area 5. In this case, after the completion of the drop-off, the automated driving system 10 resets the target stop space ST and performs the pick-up shown in FIG. 4. Since the automated driving vehicle 1 is stopped in the upstream area 5U at the time of the completion of the drop-off, the automated driving vehicle 1 is able to move to the downstream area 5D without going out of the pick-up and drop-off area 5. In other words, it is not necessary to go out of the pick-up and drop-off area 5 once, turn back the outside road, and then enter the pick-up and drop-off area 5 again. As described above, according to the present embodiment, it is possible to efficiently make a transition from the drop-off to the pick-up in the same pick-up and drop-off area 5.

1-3. Configuration Example of Automated Driving System

Figure 5:
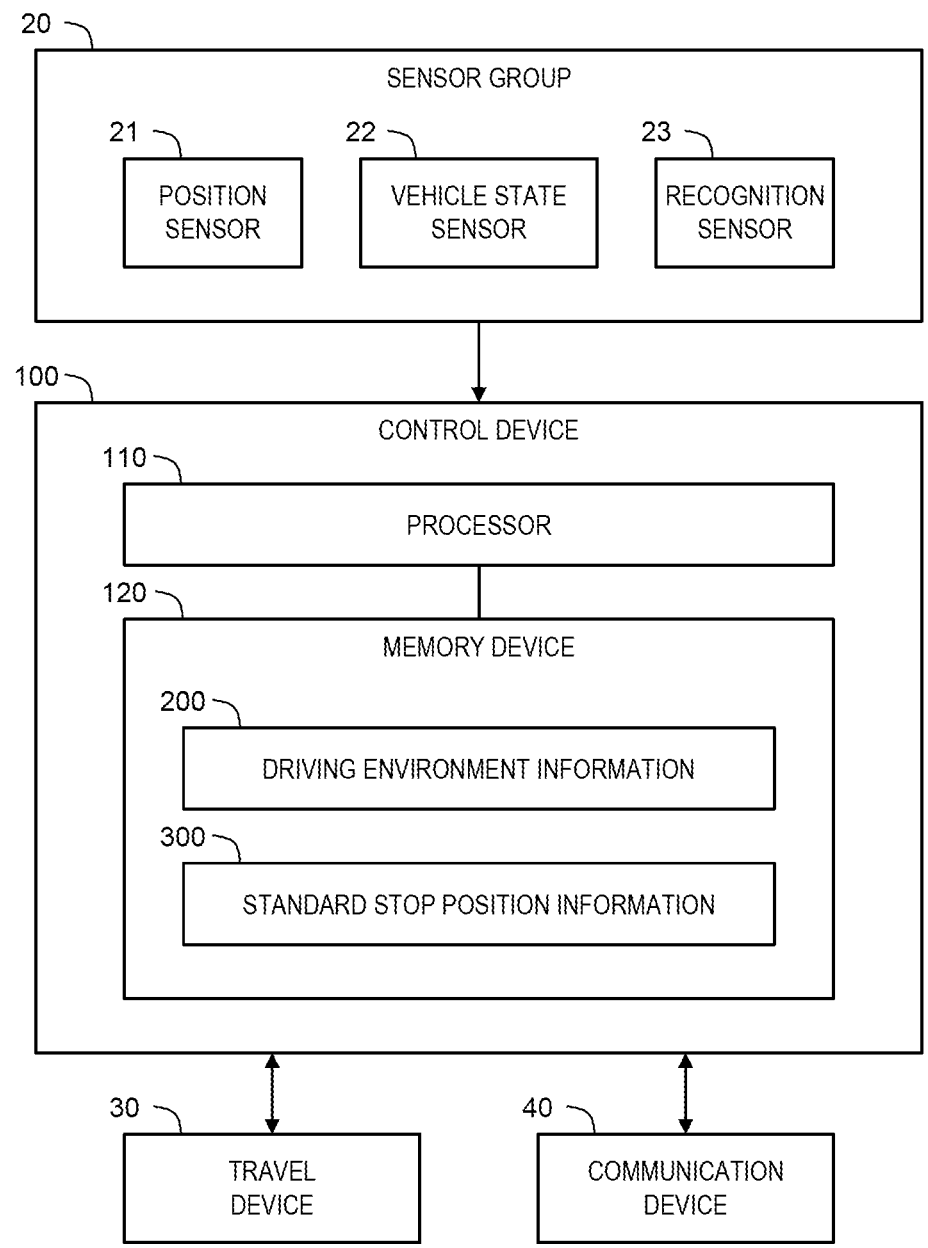
FIG. 5 is a block diagram showing a configuration example of an automated driving system according to the first embodiment.

FIG. 5 is a block diagram showing a configuration example of the automated driving system 10 according to the present embodiment. The automated driving system 10 includes a sensor group 20, a travel device 30, a communication device 40, and a control device (controller) 100.

The sensor group 20 is installed on the automated driving vehicle 1. The sensor group 20 includes a position sensor 21, a vehicle state sensor 22, and a recognition sensor 23. The position sensor 21 detects a position and an orientation of the automated driving vehicle 1. As the position sensor 21, a GPS (Global Positioning System) sensor is exemplified. The vehicle state sensor 22 detects a state of the automated driving vehicle 1. Examples of the vehicle state sensor 22 include a vehicle speed sensor, a yaw rate sensor, a lateral acceleration sensor, a steering angle sensor, and the like. The recognition sensor 23 recognizes (detects) a situation around the automated driving vehicle 1. Examples of the recognition sensor 23 include a camera, a radar, a LIDAR (Laser Imaging Detection and Ranging), and the like.

The travel device 30 is installed on the automated driving vehicle 1. The travel device 30 includes a steering device, a driving device, and a braking device. The steering device turns wheels of the automated driving vehicle 1. For example, the steering device includes an electric power steering (EPS) device. The driving device is a power source that generates a driving force. Examples of the drive device include an engine, an electric motor, an in-wheel motor, and the like. The braking device generates a braking force.

The communication device 40 communicates with the outside of the automated driving system 10. For example, the communication device 40 communicates with a management server that manages the driverless transportation service. As another example, the communication device 40 communicates with a user terminal (for example, a smartphone, a tablet, or a personal computer) owned by the user 2.

The control device (controller) 100 controls the automated driving vehicle 1. Typically, the control device 100 is a microcomputer installed on the automated driving vehicle 1. The control device 100 is also called an electronic control unit (ECU). Alternatively, the control device 100 may be an information processing device outside the automated driving vehicle 1. In this case, the control device 100 communicates with the automated driving vehicle 1 and remotely controls the automated driving vehicle 1.

The control device 100 includes a processor 110 and a memory device 120. The processor 110 executes a variety of processing. The memory device 120 stores a variety of information. Examples of the memory device 120 include a volatile memory, a nonvolatile memory, and the like. The variety of processing by the processor 110 (the control device 100) is achieved by the processor 110 executing a control program being a computer program. The control program is stored in the memory device 120 or recorded in a computer-readable recording medium.

The processor 110 executes vehicle travel control that controls travel of the automated driving vehicle 1. The vehicle travel control includes steering control, acceleration control, and deceleration control. The processor 110 executes the vehicle travel control by controlling the travel device 30. More specifically, the processor 110 executes the steering control by controlling the steering device. The processor 110 executes the acceleration control by controlling the driving device. The control device 100 executes the deceleration control by controlling the braking device.

Moreover, the processor 110 acquires driving environment information 200 indicating a driving environment for the automated driving vehicle 1. The driving environment information 200 is acquired based on a result of detection by the sensor group 20 installed on the automated driving vehicle 1. The acquired driving environment information 200 is stored in the memory device 120.

Figure 6:
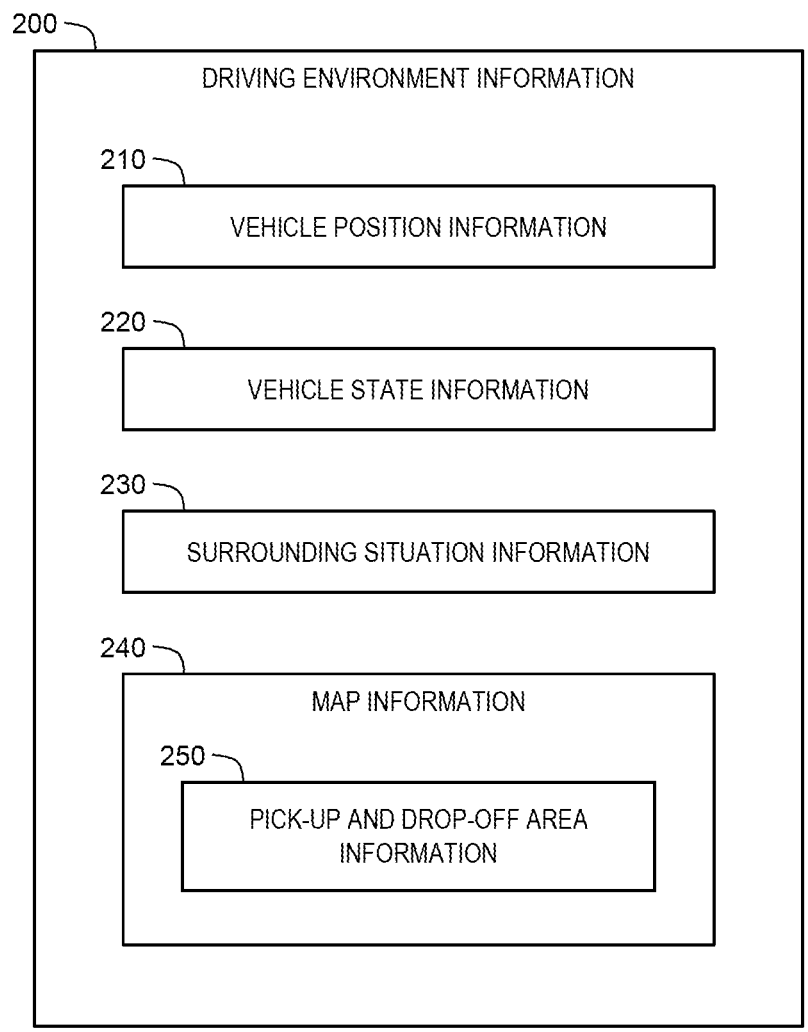
FIG. 6 is a block diagram showing an example of driving environment information in the first embodiment.

FIG. 6 is a block diagram showing an example of the driving environment information 200. The driving environment information 200 includes vehicle position information 210, vehicle state information 220, surrounding situation information 230, and map information 240.

The vehicle position information 210 is information indicating the position and the orientation of the automated driving vehicle 1 in the absolute coordinate system. The processor 110 acquires the vehicle position information 210 from a result of detection by the position sensor 21. In addition, the processor 110 may acquire more accurate vehicle position information 210 by performing a well-known localization.

The vehicle state information 220 is information indicating the state of the automated driving vehicle 1. Examples of the state of the automated driving vehicle 1 include a vehicle speed, a yaw rate, a lateral acceleration, a steering angle, and the like. The processor 110 acquires the vehicle state information 220 from a result of detection by the vehicle state sensor 22.

The surrounding situation information 230 is information indicating a situation around the automated driving vehicle 1. The surrounding situation information 230 includes information acquired by the recognition sensor 23. For example, the surrounding situation information 230 includes image information indicating a situation around the automated driving vehicle 1 imaged by the camera. As another example, the surrounding situation information 230 includes measurement information measured by the radar or the LIDAR. Further, the surrounding situation information 230 includes object information regarding an object around the automated driving vehicle 1. Examples of the object around the automated driving vehicle 1 include another vehicle, a pedestrian, a sign, a white line, a roadside structure (e.g., a guardrail, a curb), and the like. The object information indicates a relative position of the object with respect to the automated driving vehicle 1. For example, analyzing the image information obtained by the camera makes it possible to identify the object and calculate the relative position of the object. It is also possible to identify the object and acquires the relative position of the object based on the radar measurement information.

The map information 240 indicates a lane configuration, a road shape, and the like. The map information 240 includes a general navigation map. The processor 110 acquires the map information 240 of a necessary area from a map database. The map database may be stored in a predetermined storage device installed on the automated driving vehicle 1, or may be stored in a management server outside the automated driving vehicle 1. In the latter case, the processor 110 communicates with the management server via the communication device 40 to acquire the necessary map information 240.

The pick-up and drop-off area information 250 indicates a position and a range of the pick-up and drop-off area 5 provided in the facility 3. For example, the pick-up and drop-off area information 250 is registered in advance in the map information 240. As another example, the pick-up and drop-off area information 250 may be provided from the facility 3 when the automated driving vehicle 1 comes close to the facility 3. In this case, the processor 110 communicates with the facility 3 via the communication device 40 to acquire the pick-up and drop-off area information 250 related to the facility 3. It should be noted that the position and the range of the pick-up and drop-off area 5 are clearly defined on the map although the actual pick-up and drop-off area 5 may not be clear.

Furthermore, the processor 110 acquires standard stop position information 300 (see FIG. 5). The standard stop position information 300 indicates the position of the standard stop space S0 in the pick-up and drop-off area 5. For example, the standard stop position information 300 is included in advance in the pick-up and drop-off area information 250. In this case, the processor 110 acquires the standard stop position information 300 from the pick-up and drop-off area information 250. As another example, the standard stop space S0 may be specified by the user 2. In this case, the user 2 specifies the standard stop space S0 in the map by the use of the user terminal. The processor 110 communicates with the user terminal of the user 2 via the communication device 40 and acquires the standard stop position information 300 indicating the position of the specified standard stop space S0. The standard stop position information 300 is stored in the memory device 120.

It should be noted that using the vehicle position information 210 makes it possible to convert absolute positions of the pick-up and drop-off area 5 and the standard stop space S0 into relative positions with respect to the automated driving vehicle 1, and vice versa. In the following description, the position of the pick-up and drop-off area 5 or the standard stop space S0 means an appropriate one of the absolute position and the relative position.

Hereinafter, processing by the automated driving system 10 (the processor 110) in the pick-up and drop-off area 5 according to the present embodiment will be described.

1-4. Processing in Pick-Up and Drop-Off Area

Figure 7:
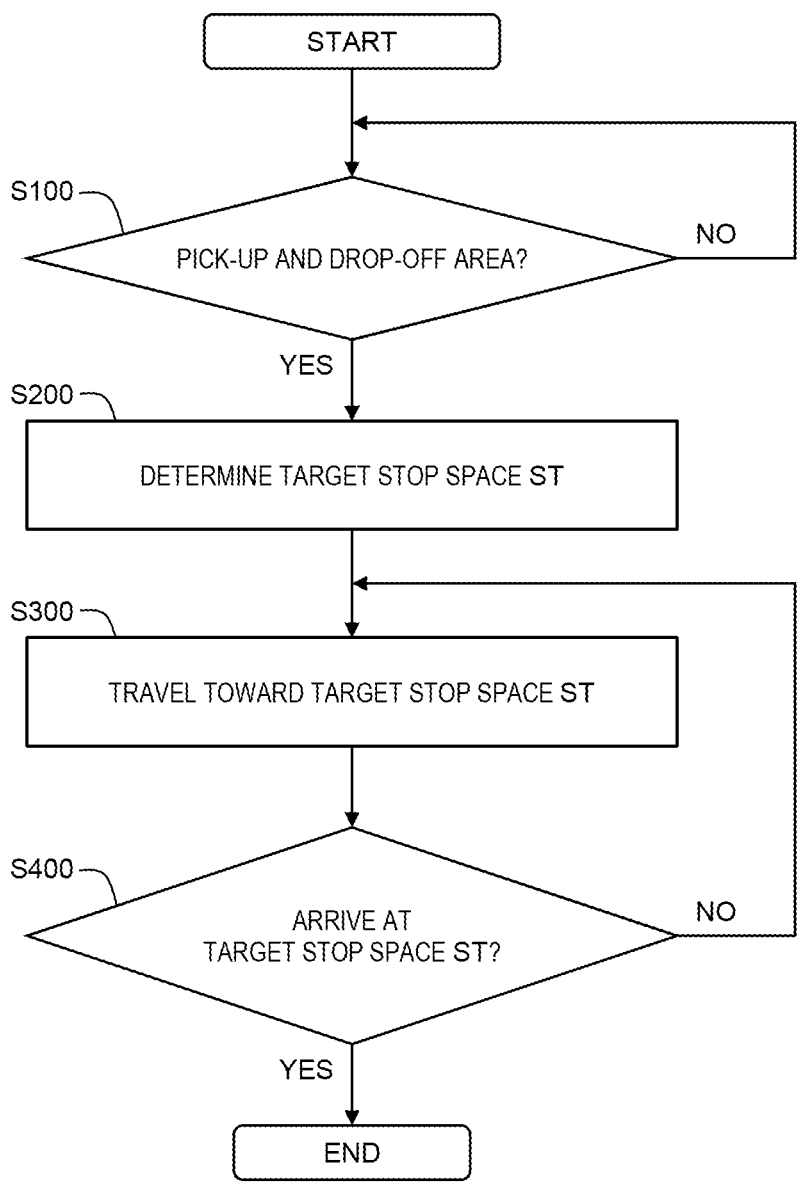
FIG. 7 is a flow chart showing processing by the automated driving system in a pick-up and drop-off area according to the first embodiment.

FIG. 7 is a flow chart showing processing by the automated driving system 10 (the processor 110) in the pick-up and drop-off area 5 according to the present embodiment. It should be noted that the above-described driving environment information 200 is updated at a predetermined cycle in another process flow. In addition, the standard stop position information 300 is already acquired. Moreover, whether a purpose of the stopping this time is the drop-off or the pick-up is registered in a travel plan of automated driving.

In Step S100, the processor 110 determines whether or not the automated driving vehicle 1 has entered the pick-up and drop-off area 5. The position of the automated driving vehicle 1 is obtained from the vehicle position information 210. The position and the range of the pick-up and drop-off area 5 are obtained from the pick-up and drop-off area information 250. Therefore, the processor 110 can determine whether or not the automated driving vehicle 1 has entered the pick-up and drop-off area 5 based on the vehicle position information 210 and the pick-up and drop-off area information 250. When the automated driving vehicle 1 enters the pick-up and drop-off area 5 (Step S100; Yes), the processing proceeds to Step S200.

As a modification example of Step S100, the processor 110 may determine whether or not the automated driving vehicle 1 has reached a position a certain distance before the pick-up and drop-off area 5. When the automated driving vehicle 1 has reached the position a certain distance before the pick-up and drop-off area 5 (Step S100; Yes), the processing proceeds to Step S200.

In Step S200, the processor 110 determines the target stop space ST in the pick-up and drop-off area 5. The surrounding situation information 230 indicates the situation around the automated driving vehicle 1. In particular, the surrounding situation information 230 includes the object information regarding the object (e.g., another vehicle 7 and the like) around the automated driving vehicle 1. Therefore, the processor 110 can determine an available target stop space ST based on the surrounding situation information 230. Details of this Step S200 will be described later.

In Step S300, the processor 110 performs the vehicle travel control such that the automated driving vehicle 1 travels toward the target stop space ST and stops in the target stop space ST. The vehicle travel control is performed based on the driving environment information 200. Since a technique for controlling the vehicle to reach a target position is well known, a detailed description thereof will be omitted.

Step S300 is repeated until the automated driving vehicle 1 arrives at the target stop space ST. When the automated driving vehicle 1 arrives at the target stop space ST (Step S400; Yes), the process flow shown in FIG. 7 ends. The user 2 gets off the automated driving vehicle 1 or gets on the automated driving vehicle 1.

Figure 8:
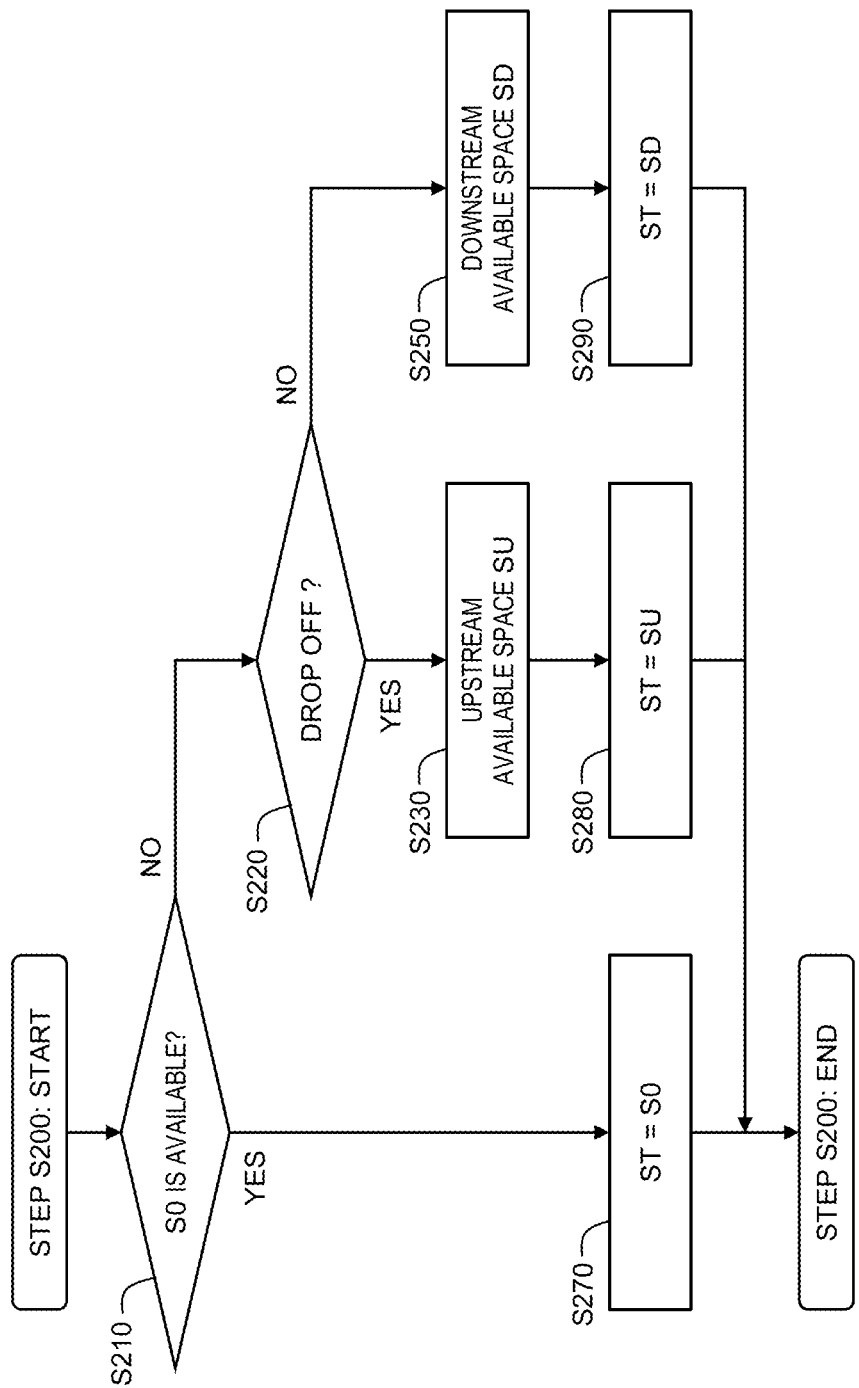
FIG. 8 is a flow chart showing processing in Step S200 according to the first embodiment.

FIG. 8 is a flow chart showing Step S200 (the determination of the target stop space ST).

In Step S210, the processor 110 determines whether or not the standard stop space S0 is available for the automated driving vehicle 1 to stop. The position of the standard stop space S0 is obtained from the standard stop position information 300. The surrounding situation information 230 includes the object information regarding the object (e.g., another vehicle 7 and the like) around the automated driving vehicle 1. Therefore, the processor 110 can determine whether or not the standard stop space S0 is available for the automated driving vehicle 1 to stop based on the surrounding situation information 230 and the standard stop position information 300.

When the standard stop space S0 is available for the automated driving vehicle 1 to stop (Step S210; Yes), the processing proceeds to Step S270. In Step S270, the processor 110 sets the standard stop space S0 as the target stop space ST.

On the other hand, when the standard stop space S0 is not available for the automated driving vehicle 1 to stop (Step S210; No), the processing proceeds to Step S220. In Step S220, the processor 110 determines, based on the travel plan of the automated driving, whether the purpose of the stopping this time is the drop-off or the pick-up. In the case of the drop-off (Step S220; Yes), the processing proceeds to Step S230. On the other hand, in the case of the pick-up (Step S220; No), the processing proceeds to Step S250.

In Step S230, the processor 110 searches for the upstream available space SU in the upstream area 5U. The upstream area 5U, which is the pick-up and drop-off area 5 upstream of the standard stop space S0, can be recognized from the pick-up and drop-off area information 250 and the standard stop position information 300. The upstream available space SU is an available space in which the automated driving vehicle 1 can be stopped. Information on the size of the automated driving vehicle 1 (not shown) is registered in the automated driving system 10 in advance. The object information regarding the object (e.g., another vehicle 7 and the like) around the automated driving vehicle 1 is obtained from the surrounding situation information 230. The processor 110 can search for the upstream available space SU based on the surrounding situation information 230.

Then, the processor 110 sets the upstream available space SU as the target stop space ST (Step S280). The processor 110 may set the upstream available space SU closest to the standard stop space S0 as the target stop space ST. Being close to the standard stop space S0 is preferable from a viewpoint of the convenience for the user 2 or the request from the user 2.

In Step S250, the processor 110 searches for the downstream available space SD in the downstream area 5D. The method of searching for the downstream available space SD is similar to that for the upstream available space SU. Then, the processor 110 sets the downstream available space SD as the target stop space ST (Step S290). The processor 110 may set the downstream available space SD closest to the standard stop space S0 as the target stop space ST. Being close to the standard stop space S0 is preferable from the viewpoint of the convenience for the user 2 or the request from the user 2.

1-5. Effects

As described above, according to the present embodiment, the automated driving system 10 controls the automated driving vehicle 1 so as to stop in the target stop space ST in the pick-up and drop-off area 5. When the standard stop space S0 is available, the automated driving system 10 sets the standard stop space S0 as the target stop space ST. On the other hand, when the standard stop space S0 is not available, the automated driving system 10 selects a priority area according to whether to drop off or pick up the user 2, and sets the target stop space ST in the priority area.

In the case of the drop-off (see FIG. 3), the upstream area 5U is the priority area. In the upstream area 5U, the upstream available space SU in which the automated driving vehicle 1 can be stopped is searched for. Then, the upstream available space SU is set as the target stop space ST. Making the automated driving vehicle 1 stop not in the downstream area 5D but in the upstream area 5U enables the user 2 to more quickly get off the automated driving vehicle 1. As a result, the user 2 becomes free more quickly and is able to use time efficiently. That is, the convenience and the time efficiency are improved from the viewpoint of the user 2.

On the other hand, in the case of the pick-up (see FIG. 4), the downstream area 5D is the priority area. In the downstream area 5D, the downstream available space SD in which the automated driving vehicle 1 can be stopped is searched for. Then, the downstream available space SD is set as the target stop space ST. The automated driving vehicle 1 stopped in the downstream area 5D is able to exit the pick-up and drop-off area 5 earlier than when the automated driving vehicle 1 is stopped in the upstream area 5U. Therefore, making the automated driving vehicle 1 stop not in the upstream area 5U but in the downstream area 5D enables the automated driving vehicle 1 with the user 2 to more quickly depart for the destination. That is, the time efficiency is improved from the viewpoint of the user 2.

Moreover, when viewed from the automated driving vehicle 1 stopped in the downstream area 5D, the standard stop space S0 exists rearward. Therefore, another vehicle 7 stopped in the standard stop space S0 does not hinder the automated driving vehicle 1 from starting. Therefore, the automated driving system 10 is able to easily make the automated driving vehicle 1 start moving. This is preferable from a viewpoint of the vehicle travel control. In addition, the automated driving system 10 is able to make the automated driving vehicle 1 depart without delay. This contributes not only to improvement in the time efficiency but also to reduction in the user 2's stress in the automated driving vehicle 1.

After completion of the drop-off, the automated driving vehicle 1 may pick up another user 2 in the same pick-up and drop-off area 5. Since the automated driving vehicle 1 is stopped in the upstream area 5U at the time of the completion of the drop-off, the automated driving vehicle 1 is able to move to the downstream area 5D without going out of the pick-up and drop-off area 5. In other words, it is not necessary to go out of the pick-up and drop-off area 5 once, turn back the outside road, and then enter the pick-up and drop-off area 5 again. That is, it is possible to efficiently make a transition from the drop-off to the pick-up in the same pick-up and drop-off area 5.

2. Second Embodiment

A second embodiment proposes a more flexible response when the standard stop space S0 is not available. An overlapping description with the first embodiment will be omitted as appropriate.

2-1. Drop-Off

Figure 9:
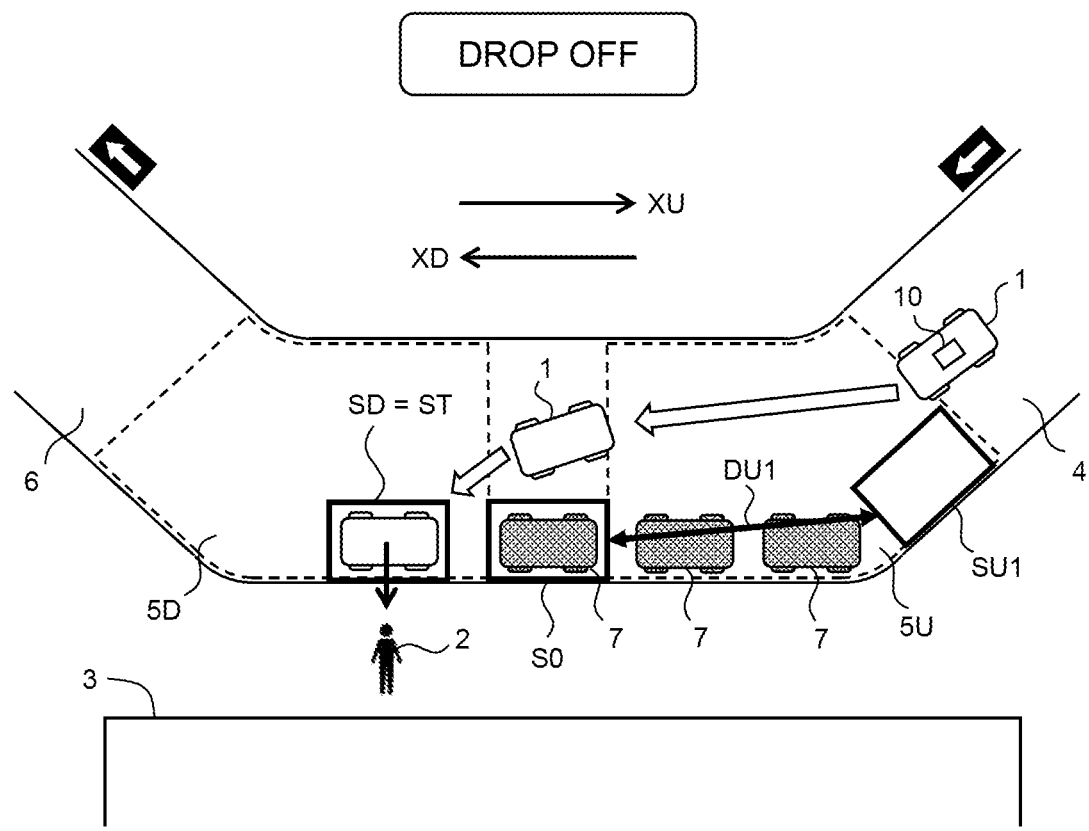
FIG. 9 is a conceptual diagram for explaining a method of determining a stop space in a case of drop-off according to a second embodiment.

FIG. 9 is a conceptual diagram for explaining a method of determining the stop space in the case of the drop-off according to the second embodiment. A plurality of other vehicles 7 are continuously stopped in the upstream direction XU from the standard stop space S0. The upstream available space SU closest to the standard stop space S0 is referred to as a "first upstream available space SU1" for the sake of convenience. When the first upstream available space SU1 is too far from the standard stop space S0, the drop-off position also is too far from the entrance of the facility 3 or too far from the position specified by the user 2. In such a case, it is not necessarily required to adhere to the first upstream available space SU1. It is also conceivable to use the downstream available space SD in the downstream area 5D instead of the first upstream available space SU1 which is too far from the standard stop space S0.

In view of the above, according to the second embodiment, the target stop space ST is determined in consideration of a distance DU1 between the standard stop space S0 and the first upstream available space SU1, for the purpose of flexible response. More specifically, when the distance DU1 is equal to or less than a threshold Dth, the upstream available space SU is set as the target stop space ST as in the case of the first embodiment. On the other hand, when the distance DU1 exceeds the threshold Dth, the downstream available space SD instead of the first upstream available space SU1 is set as the target stop space ST. That is, although the upstream available space SU is basically used as the target stop space ST, it is also possible to use the downstream available space SD as the target stop space ST only when the first upstream available space SU1 is too far from the standard stop space S0. Such the method also is included in the concept of "preferentially" setting the upstream available space SU as the target stop space ST.

2-2. Pick-Up

Figure 10:
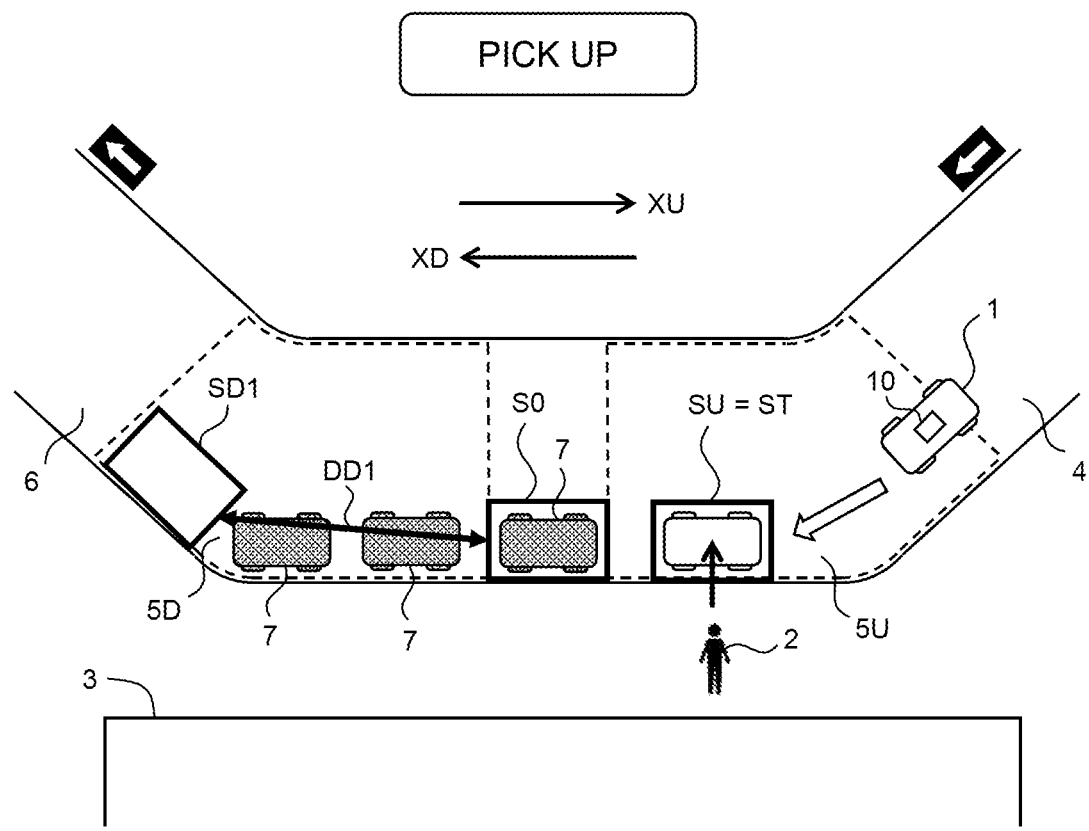
FIG. 10 is a conceptual diagram for explaining a method of determining a stop space in a case of pick-up according to the second embodiment.

FIG. 10 is a conceptual diagram for explaining a method of determining the stop space in the case of the pick-up according to the second embodiment. A plurality of other vehicles 7 are continuously stopped in the downstream direction XD from the standard stop space S0. The downstream available space SD closest to the standard stop space S0 is referred to as a "first downstream available space SD1" for the sake of convenience. As in the case of the drop-off described above, the target stop space ST is determined in consideration of a distance DD1 between the standard stop space S0 and the first downstream available space SD1, for the purpose of flexible response.

More specifically, when the distance DD1 is equal to or less than a threshold Dth, the downstream available space SD is set as the target stop space ST as in the case of the first embodiment. On the other hand, when the distance DD1 exceeds the threshold Dth, the upstream available space SU instead of the first downstream available space SD1 is set as the target stop space ST. That is, although the downstream available space SD is basically used as the target stop space ST, it is also possible to use the upstream available space SU as the target stop space ST only when the first downstream available space SD1 is too far from the standard stop space S0. Such the method also is included in the concept of "preferentially" setting the downstream available space SD as the target stop space ST.

2-3. Process Flow

Figure 11:
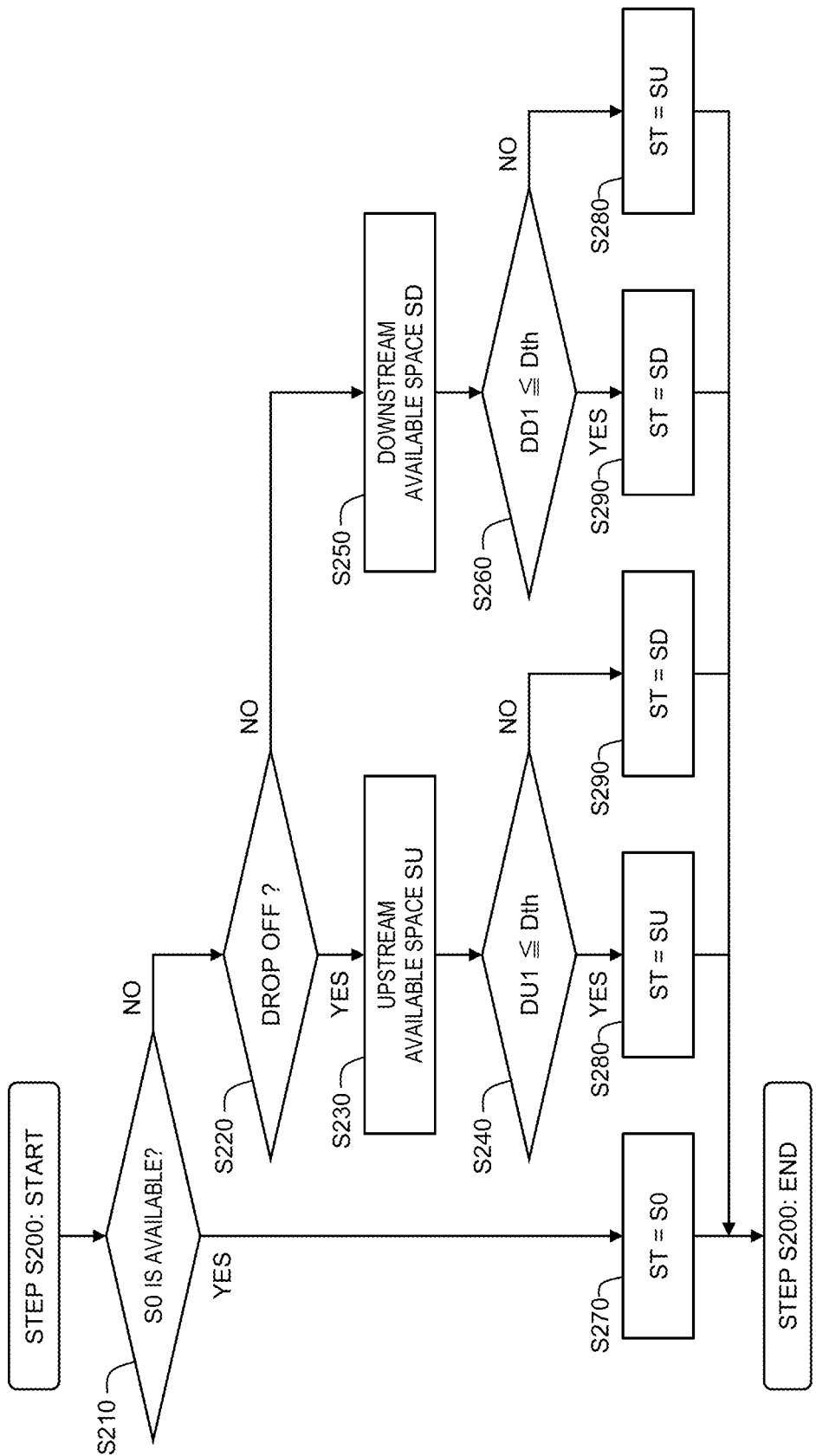
FIG. 11 is a flow chart showing processing in Step S200 according to the second embodiment.

FIG. 11 is a flow chart showing Step S200 (the determination of the target stop space ST) according to the second embodiment. An overlapping description with the first embodiment described in FIG. 8 will be omitted as appropriate.

In Step S230 (drop off), the processor 110 searches for the upstream available space SU in the upstream area 5U. The first upstream available space SU1 is the upstream available space SU closest to the standard stop space S0. In subsequent Step S240, the processor 110 determines whether or not the distance DU1 between the standard stop space S0 and the first upstream available space SU1 is equal to or less than the threshold Dth. When the distance DU1 is equal to or less than the threshold Dth (Step S240; Yes), the processor 110 sets the upstream available space SU as the target stop space ST (Step S280). On the other hand, when the distance DU1 exceeds the threshold Dth (Step S240; No), the processor 110 searches for the downstream available space SD in the downstream area 5D, and sets the downstream available space SD as the target stop space ST (Step S290).

In Step S250 (pick-up), the processor 110 searches for the downstream available space SD in the downstream area 5D. The first downstream available space SD1 is the downstream available space SD closest to the standard stop space S0. In subsequent Step S260, the processor 110 determines whether or not the distance DD1 between the standard stop space S0 and the first downstream available space SD1 is equal to or less than the threshold Dth. When the distance DD1 is equal to or less than the threshold Dth (Step S260; Yes), the processor 110 sets the downstream available space SD as the target stop space ST (Step S290). On the other hand, when the distance DU1 exceeds the threshold Dth (Step S260; No), the processor 110 searches for the upstream available space SU in the upstream area 5U and sets the upstream available space SU as the target stop space ST (Step S280).

2-4. Effects

As described above, according to the second embodiment, the target stop space ST is basically determined in the same manner as in the first embodiment. However, only when the first upstream available space SU1 is too far from the standard stop space S0, the downstream available space SD is used as the target stop space ST instead. Similarly, only when the first downstream available space SD1 is too far from the standard stop space S0, the upstream available space SU is used as the target stop space ST instead. Such the flexible response can prevent the target stop space ST from becoming too far from the standard stop space S0. As a result, the user 2's dissatisfaction caused by the target stop space ST becoming too far from the standard stop space S0 is reduced.

What is claimed is:

1. An automated driving system that controls an automated driving vehicle providing a driverless transportation service to a user, wherein a pick-up and drop-off area is a predetermined area in which the automated driving vehicle stops to pick up or drop off the user, the automated driving system comprising:
a processor configured to control the automated driving vehicle so as to stop in a target stop space in the pick-up and drop-off area; and
a memory configured to store standard stop position information indicating a position of a standard stop space in the pick-up and drop-off area and surrounding situation information indicating a situation around the automated driving vehicle, wherein
a direction of vehicle travel in the pick-up and drop-off area is a first direction that is predetermined,
the pick-up and drop-off area includes a downstream area existing in the first direction from the standard stop space and an upstream area existing in a second direction opposite to the first direction from the standard stop space, and
the processor is further configured to:
determine, based on the surrounding situation information, whether or not the standard stop space indicated by the standard stop position information is available for the automated driving vehicle to stop;
when the standard stop space is available for the automated driving vehicle to stop, set the standard stop space as the target stop space; and
when the standard stop space is not available for the automated driving vehicle to stop to drop off the user, search for an upstream available space in the upstream area in which the automated driving vehicle can be stopped based on the surrounding situation information, and automatically set the upstream available space as the target stop space, wherein
when the standard stop space is not available for the automated driving vehicle to stop to drop off the user, the processor searches for a first upstream available space closest to the standard stop space,
when a distance between the standard stop space and the first upstream available space exceeds a threshold, the processor searches for a downstream available space in the downstream area in which the automated driving vehicle can be stopped based on the surrounding situation information, and sets the downstream available space as the target stop space, and when the automated driving vehicle drops off the user in the upstream area prior to the pick up of another user, the processor sets the downstream available space closest to the standard stop space as the target stop space for the pick up.

2. The automated driving system according to claim 1, wherein when the standard stop space is not available for the automated driving vehicle to stop to pick up the user, the processor searches for the downstream available space in the downstream area in which the automated driving vehicle can be stopped based on the surrounding situation information, and sets the downstream available space as the target stop space.

3. An automated driving system that controls an automated driving vehicle providing a driverless transportation service to a user, wherein a pick-up and drop-off area is a predetermined area in which the automated driving vehicle stops to pick up or drop off the user, the automated driving system comprising:

a processor configured to control the automated driving vehicle so as to stop in a target stop space in the pick-up and drop-off area; and a memory configured to store standard stop position information indicating a position of a standard stop space in the pick-up and drop-off area and surrounding situation information indicating a situation around the automated driving vehicle, wherein a direction of vehicle travel in the pick-up and drop-off area is a first direction that is predetermined, the pick-up and drop-off area includes a downstream area existing in the first direction from the standard stop space and an upstream area existing in a second direction opposite to the first direction from the standard stop space, and the processor is further configured to:

determine, based on the surrounding situation information, whether or not the standard stop space indicated by the standard stop position information is available for the automated driving vehicle to stop;

when the standard stop space is available for the automated driving vehicle to stop, set the standard stop space as the target stop space; and when the standard stop space is not available for the automated driving vehicle to stop to pick up the user, search for a downstream available space in the downstream area in which the automated driving vehicle can be stopped based on the surrounding situation information, and automatically set the downstream available space as the target stop space, wherein when the standard stop space is not available for the automated driving vehicle to stop to pick up the user, the processor searches for a first downstream available space closest to the standard stop space, when a distance between the standard stop space and the first downstream available space exceeds a threshold, the processor searches for an upstream available space in the upstream area in which the automated driving vehicle can be stopped based on the surrounding situation information, and sets the upstream available space as the target stop space, and when the automated driving vehicle drops off the user in the upstream area prior to the pick up of another user, the processor sets the downstream available space closest to the standard stop space as the target stop space for the pick up.

* * * * *